United States Patent [19]

Clark

[11] Patent Number: 5,148,835

[45] Date of Patent: Sep. 22, 1992

[54] WELL CASING PIPE THREAD PROTECTOR

[76] Inventor: Jim W. Clark, P.O. Box 935, Houma, La. 70361

[21] Appl. No.: 827,402

[22] Filed: Jan. 29, 1992

Related U.S. Application Data

[63] Continuation of Ser. No. 572,266, Aug. 27, 1990.

[51] Int. Cl.$^5$ .............................................. B65D 59/00
[52] U.S. Cl. ................................. 138/96 T; 138/96 R
[58] Field of Search ...................... 138/96 R, 96 T, 89, 138/99, 110, 178; 215/829, 275, 43 A; 166/243

[56] References Cited

U.S. PATENT DOCUMENTS

| | | | |
|---|---|---|---|
| 4,020,873 | 5/1977 | Palarino | 138/96 T |
| 4,036,261 | 7/1977 | Hauk et al. | 138/96 T |
| 4,205,707 | 6/1980 | Lundgren | 138/96 T |
| 4,349,048 | 9/1982 | Clark | 138/96 T |
| 4,616,679 | 10/1986 | Benton | 138/96 T |

Primary Examiner—Harvey C. Hornsby
Assistant Examiner—Reginald L. Alexander
Attorney, Agent, or Firm—William David Kiesel; Robert C. Tucker

[57] ABSTRACT

A device for protecting the threads of a well casing pipe which comprises a body constructed from flexible material and having resilient characteristics, wherein the body has a central opening sized to fit about the threads, a passageway extending through the body concentric to the central opening, a locking section having a cavity connecting to the passageway, a strap constructed from a high tensile strength fiber web material and positioned in the passageway with its opposite ends extending into the cavity, and a locking means operatively attached to the opposite ends of the strap to tighten the strap about the body to the degree necessary for the body to contact the threads.

3 Claims, 7 Drawing Sheets

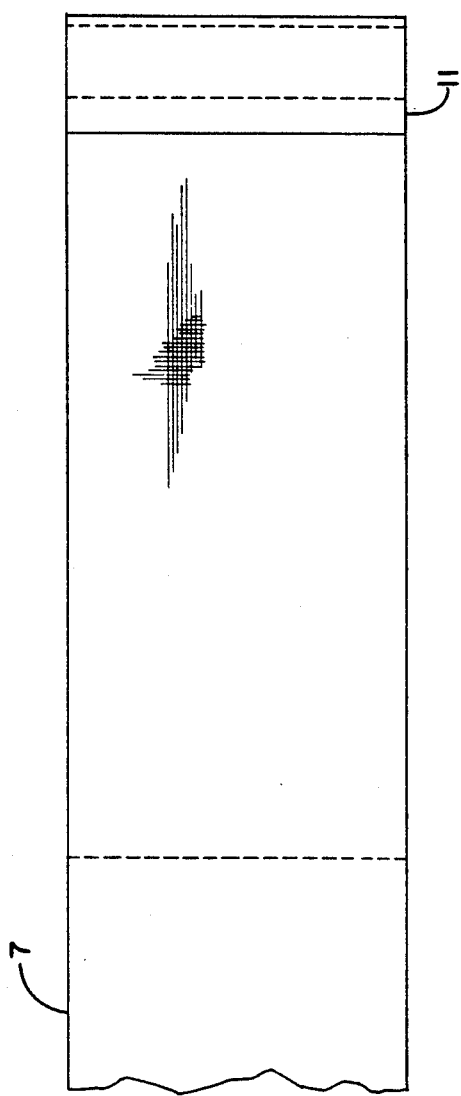
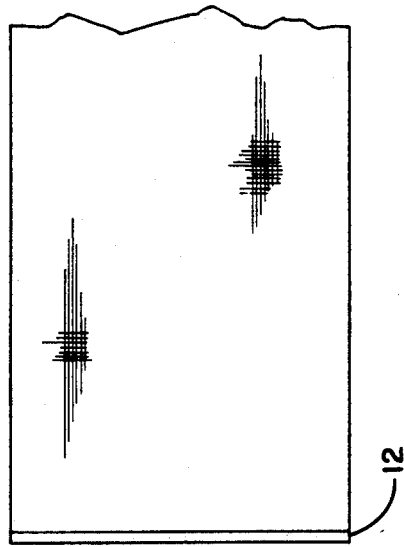
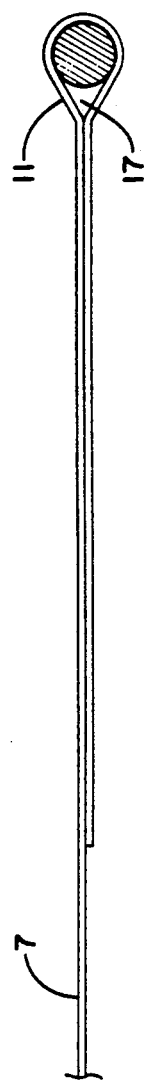
FIGURE 4A
FIGURE 4B

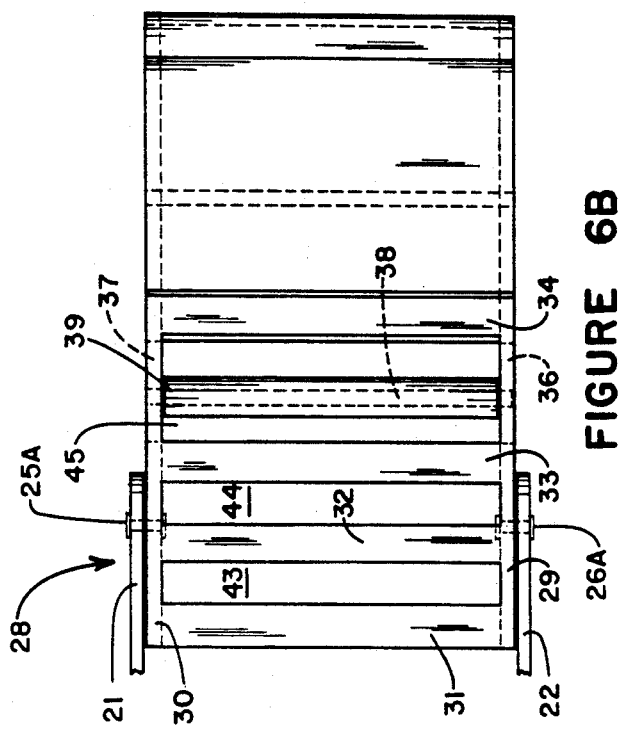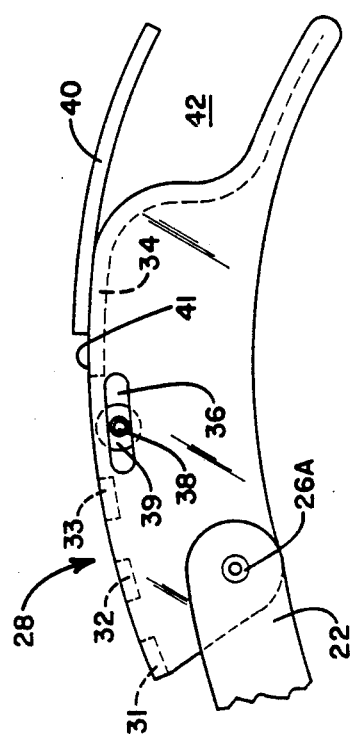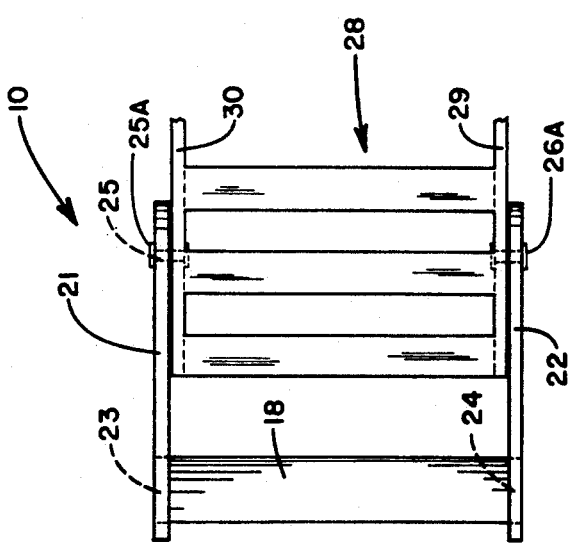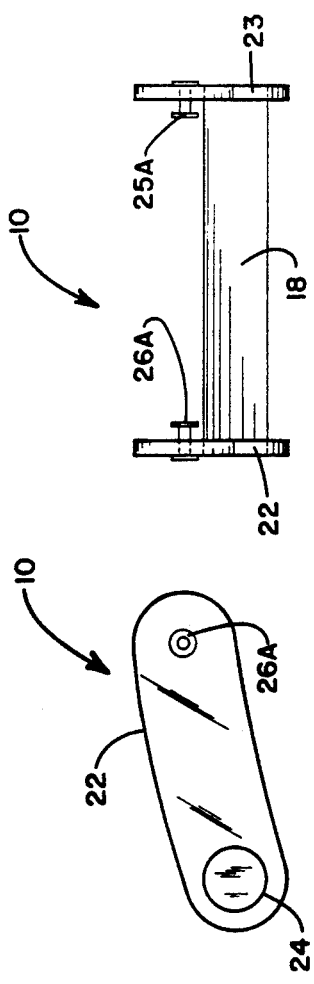

WELL CASING PIPE THREAD PROTECTOR

This is a continuation of copending application Ser. No. 07/572,266 filed on Aug. 27, 1990.

BACKGROUND OF THE INVENTION

1. Field of the Invention

This invention relates in general to devices for protecting the threaded ends of well casing pipes.

2. Prior Art. One re-occurring problem in the drilling industry has been the damage to pipe threads during handling. It is not unusual for drill pipe to be 30–60 feet long and weigh in excess of 2000 pounds. Thus if a drill pipe is dropped or if it is bounced against another drill pipe or if it is drug across the floor of a drilling platform the threads may well become damaged. If this occurs it may be impossible to connect two adjoining pieces of drill pipe, or if joined may result in improper sealing between the joints or in a weakened joint.

Previous means for protecting the threads of drill pipe have included wrapping the threads with some type of protective coating. However these prior art devices are not easily installed or removed. Furthermore they have not allowed for drift gauging the pipe when installed on the casing. In other cases they simply have not been able to withstand the shock that can be incurred during normal handling of the drill pipe.

To overcome the deficiencies in earlier prior art devices various types of belting devices have been proposed. Such a device is disclosed and described in U S. Pat. No. 3,240,232, issued to Carrol J. Matherne on Mar. 15, 1966. Therein a thread protector is disclosed which includes a tension belt, a latching structure interconnecting the ends of the tension belt and a body of resilient material associated with the tension belt and latching structure so that the protector may be mounted on the threaded end of a pipe to allow the pipe to be gauged by a drift gauge in a well-known manner. This type of thread protector has been in use in the oil well field for some time. U.S. Pat. No. 3,038,502 issued to Ernest D. Hauk et al on Jun. 12, 1962, discloses another thread protector having generally the same components as the above-mentioned patent except that the latching device is cam operated and includes a handle structure extending diametrically of the pipe on which the protector is mounted. U.S. Pat. No. 4,036,261, issued to Ernest D. Hauk on Jul. 17, 1977, discloses another type of thread protector which is pneumatically operated. Other prior art patents relating to thread protectors are listed in the above mentioned patents. On Sep. 14, 1982 U.S. Pat. No. 4,349,048 issued to the inventor herein disclosing an improved pipe thread protector which overcame many of the problems with the other prior art devices. This thread protector incorporated an internal metal band vulcanized in the body wherein the band was rolled to an open position and heat treated to provide opening spring action. The opening and closing movement was achieved by a link and bolt assembly actuated with a handle rotation. However, there is still need for a pipe thread protector device especially useful for well casing pipe that is less likely to be damaged during the movement of the well casing pipe, as well as quicker and easier to repair, install and remove from the well casing pipe at the drill site. In addition it is desirable to provide a well casing pipe thread protector that allows thread inspection at the pipe rack on the drilling platform rather than at the well head.

OBJECTS AND SUMMARY OF THE INVENTION

Therefore it is an object of this invention to provide a well casing pipe thread protector device that can be easily installed or removed from the well casing pipe.

Another object of this invention is to provide a well casing pipe thread protector device that will when attached allow for drift gauging the well casing pipe when installed on the casing before the pipe is connected to another pipe joint at the well head.

Still another object of this invention is to provide a well casing pipe thread protector device that can withstand the shock that is incurred during normal handling of well casing pipe from the pipe rack to the well head.

A still further object of this invention is to provide a well casing pipe thread protector device that can withstand the chemical environment that the well casing pipe will be exposed to during normal use.

In addition it is an object of this invention to provide a well casing pipe thread protector device that can not be easily pulled off during transport from the pipe rack to the well head.

An additional object is to provide a well casing pipe thread protector device that can support the weight of one end of the well casing pipe joint without excessive deformation.

A further object of this invention is to provide a well casing pipe thread protector device that can be easily, safely and quickly installed on or removed from the well casinq pipe by a human operator without the use of other tools.

Another object of this invention is to provide a well casing pipe thread protector device that can be easily and quickly repaired in the field by removal and replacement of strap and locking means.

Still another object of this invention is to provide a well casing pipe thread protector device which when attached to the pipe will allow thread inspection at the pipe rack.

A further object of this invention is to provide a well casing pipe thread protector device which when attached to the well casing pipe will not damage the pipe threads.

Still other objects and advantages of this invention shall be apparent from the ensuing descriptions of the invention.

Accordingly, a well casing pipe thread protector device is provided comprising a body constructed from flexible material and having resilient characteristics, wherein the body has been molded to have a central opening in which the threads can fit and sized to fit about the threads, a passageway extending through the body concentric to the central opening, a locking section having a cavity connecting to the passageway, a strap constructed of a high tensile strength fiber web material and positioned in the passageway with its opposite ends extending into the cavity, and a locking means operatively attached to the opposite ends of the strap to tighten the strap about the body to the degree necessary for the body to contact the threads.

BRIEF DESCRIPTION OF THE DRAWINGS

FIG. 4A is a top view of the belt webbing used with the invention.

FIG. 4B is a side view of the belt webbing of FIG. 4A.

FIG. 5A is a side view of a preferred embodiment of the link assembly forming part of the locking assembly of the invention.

FIG. 5B is a top view of the parallel link assembly plates of FIG. 5A.

FIG. 5C is a front view of the parallel link assembly plates of FIG. 5A.

FIG. 6A is a side view of a preferred embodiment of the locking assembly forming part of the invention.

FIG. 6B is a top view of the locking assembly of FIG. 6A.

PREFERRED EMBODIMENTS OF THE INVENTION

Figure 1:
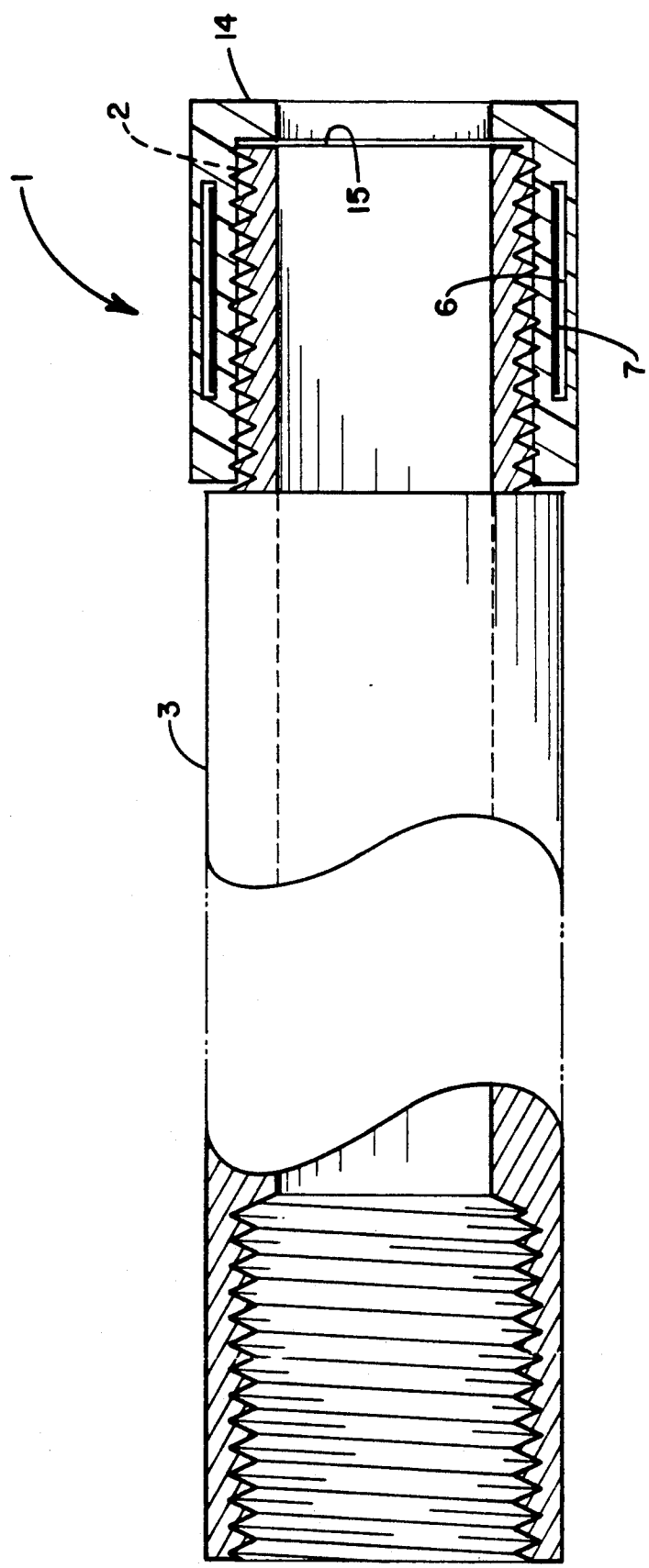
FIG. 1 is a side partial cutaway view of a preferred embodiment of the body forming part of this invention positioned on a well casing pipe.

Referring to FIG. 1 the pipe thread protector device of this invention, denoted generally by the numeral 1, is shown in position on the exposed threaded end 2 of a typical well casing pipe 3. In its broadest aspects thread protector device 1 (see FIG. 7) comprises a body 4 having a central opening 5 sized to fit about threaded end 2, a passageway 6 extending through body 4 concentric to central opening 5 through which a strap 7 passes and a section 8 having a cavity 9 connecting with passageway 6 and into which locking assembly 10 can fit. The opposite ends 11 and 12 of strap 7 are operatively attached to the locking assembly 10 as more fully explained below.

Figure 2:
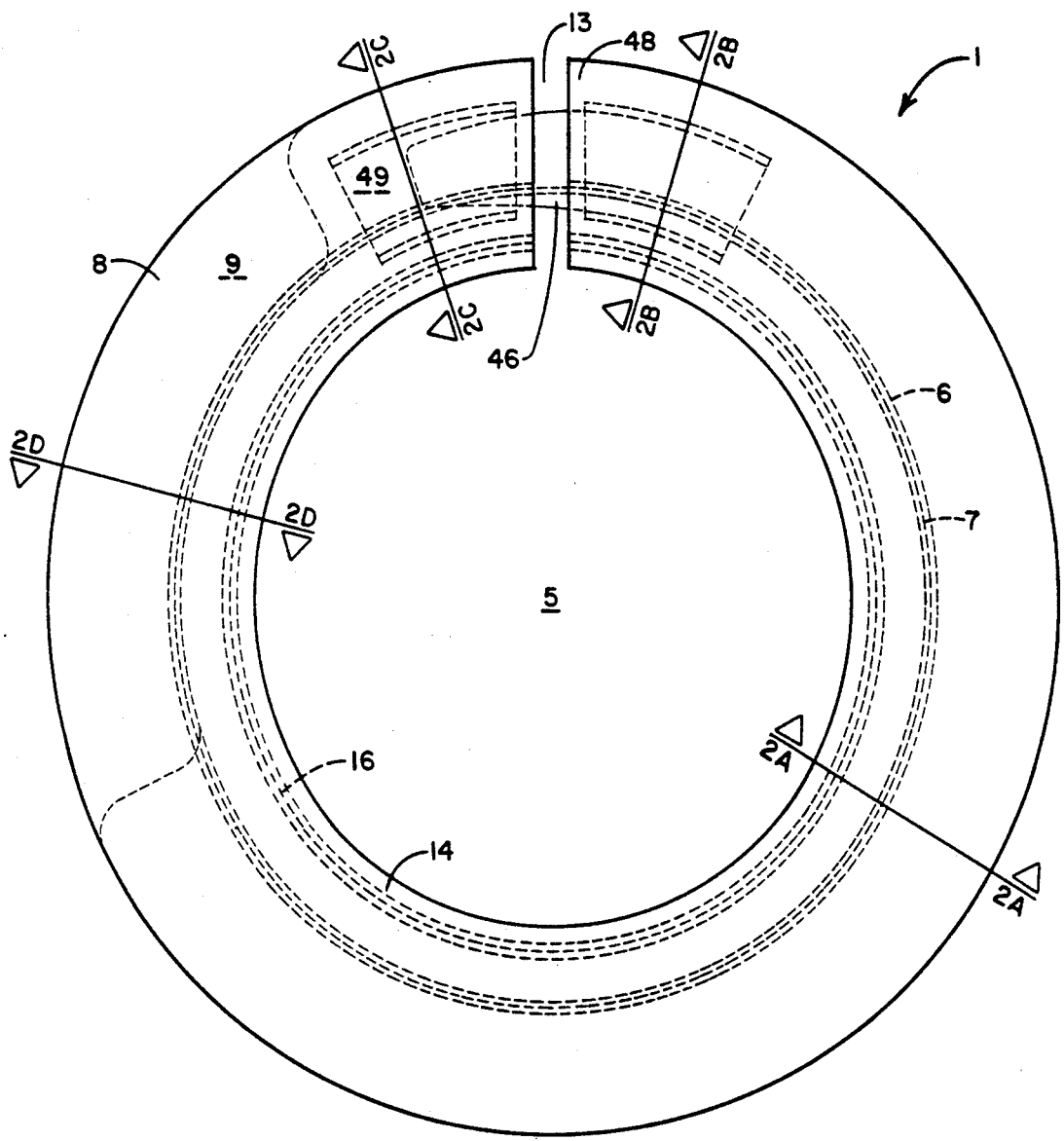
FIG. 2 is a cross sectional view of a preferred embodiment of the well casing pipe thread protector device of this invention.
Figure 2B:
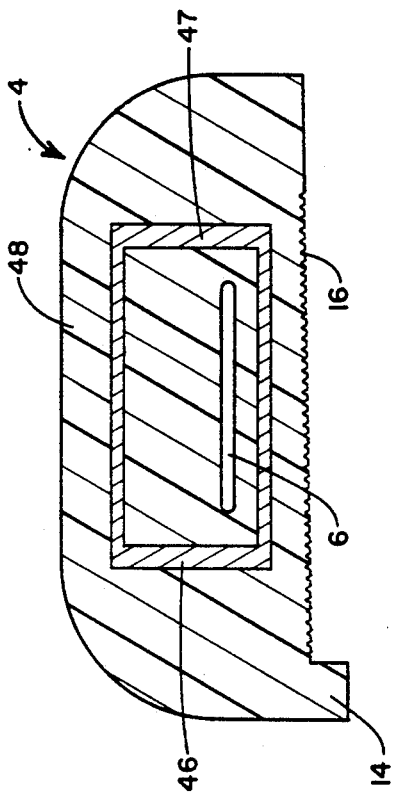
FIG. 2B is a cross sectional view of FIG. 2 taken along lines B—B.
Figure 2D:
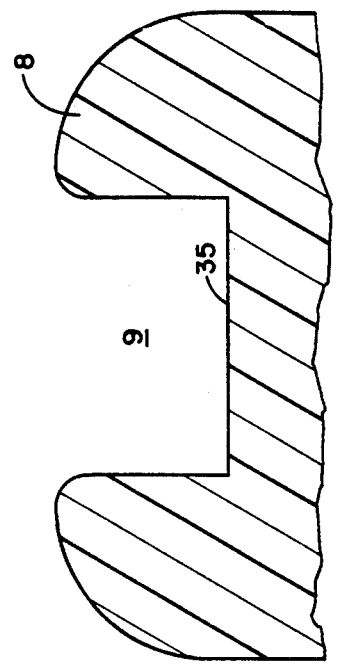
FIG. 2D is a cross sectional view of FIG. 2 taken along lines D—D.
Figure 2A:
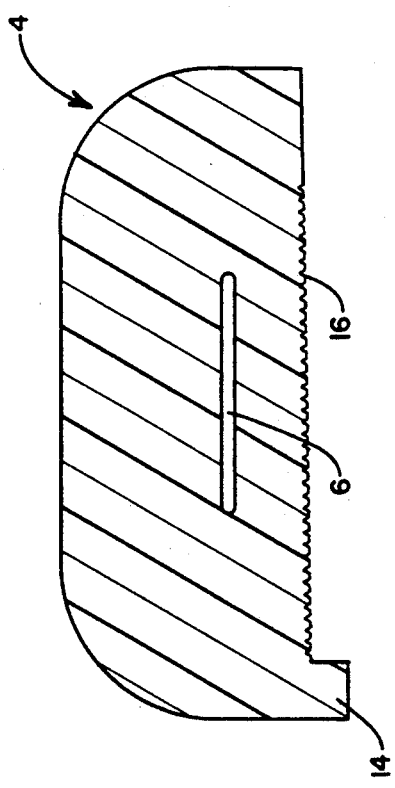
FIG. 2A is a cross sectional view of FIG. 2 taken along lines A—A.
Figure 2C:
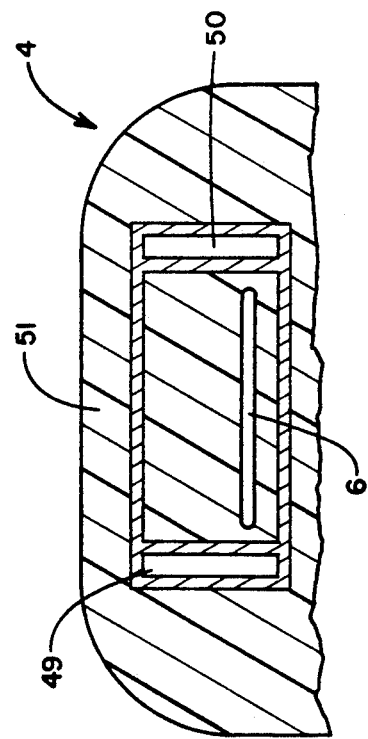
FIG. 2C is a cross sectional view of FIG. 2 taken along lines C—C.
Figure 3:
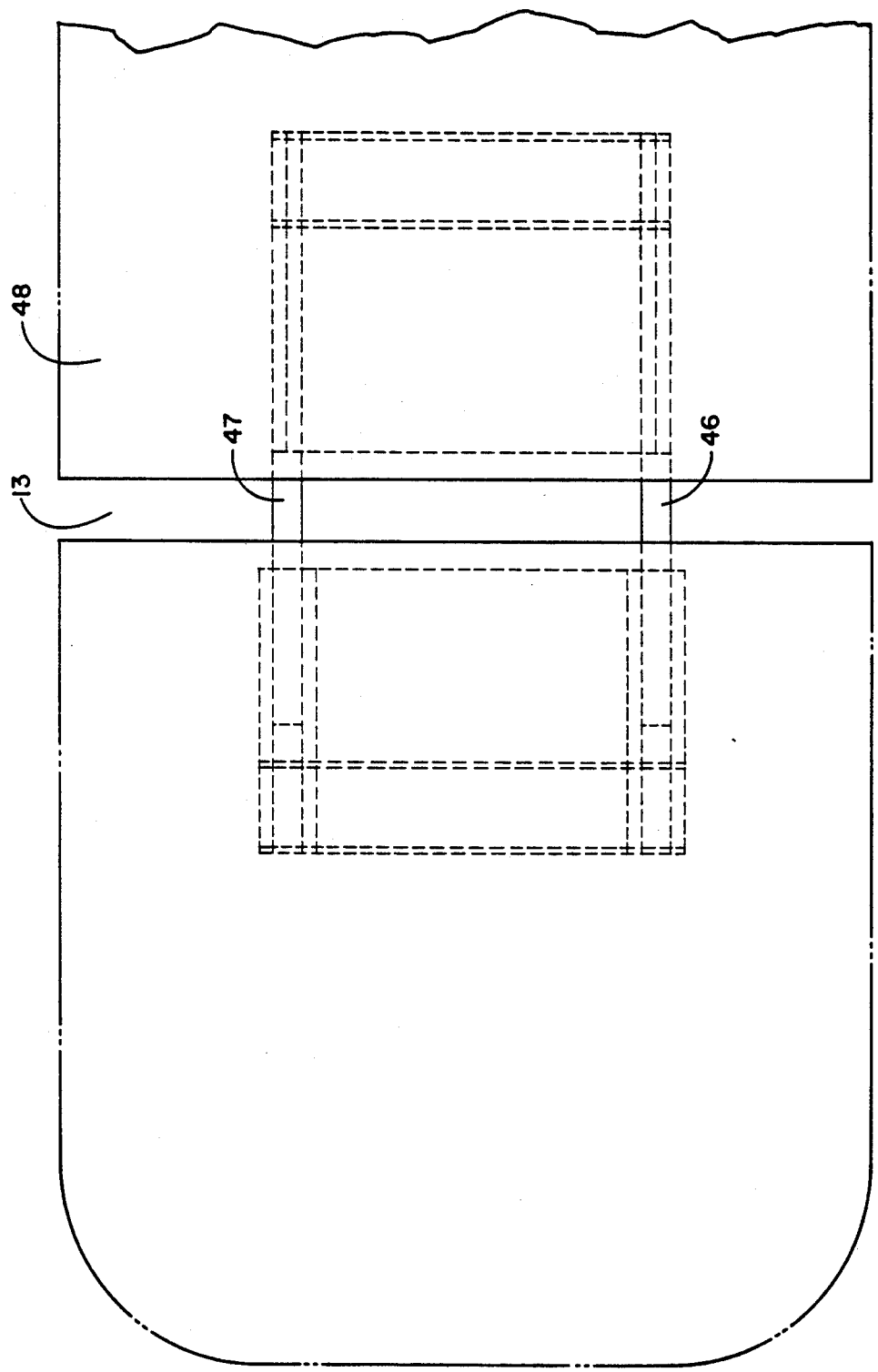
FIG. 3 is an enlarged detail of FIG. 2 of the opposite ends of the body of the invention.

A particularly preferred embodiment of body 4 is depicted in FIGS. 2-2E. Body 4 is constructed from flexible material having resilient characteristics and which is capable of sustaining the forces which typically occur when handling well casing pipe. One preferred suitable material is neoprene having a hardness of 70 to 80 durometer more particularly 75 durometer. Such material has also been found to be resistant to the chemicals typically found in a drilling environment. It is also preferred that body 4 be molded in an open position so as to form gap 13. In another preferred embodiment, body 4 is molded in an open position so that gap 13 will be sufficiently wide to allow body 4 to be positioned about pipe 3 without further expansion. Thus, molded resilient material of body 4 creates the required opening force as well as enabling easier mounting and dismounting of body 4 from the threaded pipe end 2. As a safety feature it is also preferred that the color of body 4 contrast with the color of well casing pipe 3. It is also preferred that the outside edges of section 8 be arcuate shaped to better enable the thread protector device 1 to slide over uneven surfaces of the drilling platform floor.

To assist in alignment of thread protector 1 it is preferred that body 4 be provided with a lip 14 at one of its ends that extends at least partially around central opening 5 and overhangs so as to be flush with pipe end 15 when body 4 has been placed about threaded end 2.

In another preferred embodiment at least part of body surface 16 which is in contact with well casing pipe 3 is grooved to help prevent slippage of the body 4 on well casing pipe 3.

Passageway 6 is preferably constructed having basically a rectangular cross section to accommodate strap 7. Strap 7 is constructed from a high tensile strength fiber web having characteristics that can withstand weather deterioration. Strap end 12 has a taller vertical cross section than that of strap 7 in order to prevent strap 7 from becoming disengaged from locking assembly 10 as explained below. Strap 7 is folded over and glued or otherwise fixedly connected to itself to form end 12 having loop 17 through which rod 18 can pass. Strap 7 is inserted into passageway 6 by pushing strap end 12 through passageway opening 19 in one end of cavity 9 until it emerges through opening 20 on the opposite side of cavity 9. Strap 7 is then pulled until end 11 is flush with opening 19. Strap end 12 is then attached to locking assembly 10 a explained below.

Figure 7:
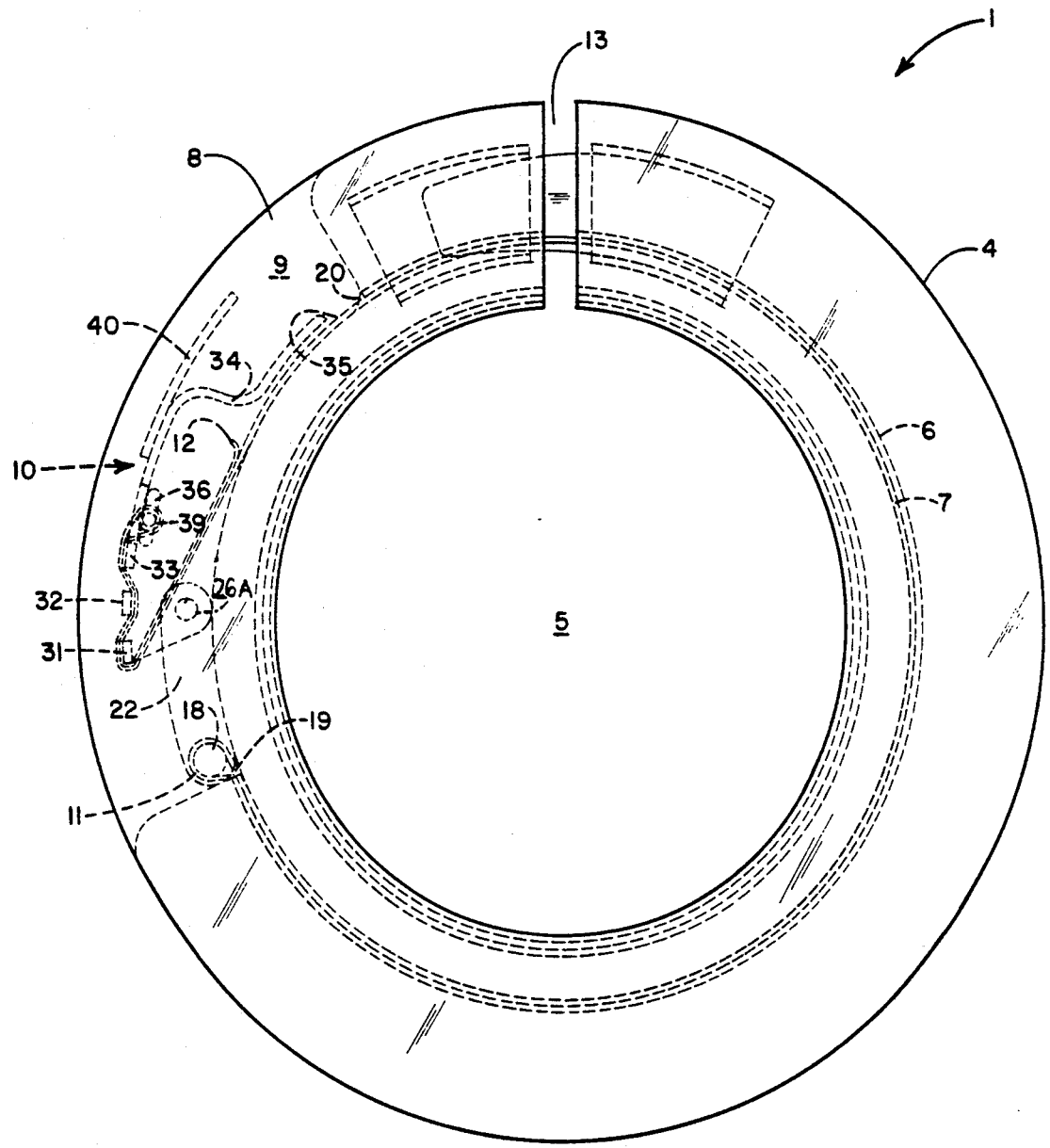
FIG. 7 is a cross sectional view of a preferred embodiment of this invention.

Locking assembly 10 comprises (i) parallel linking members 21 and 22 (see FIGS. 5A-5C and FIG. 7) that have a first pair of aligned openings 23 and 24, respectively, to receive the ends of rod 18 and a second pair of aligned openings 25 and 26 to receive rivets 25A and 26A and to operatively fix linking members 21 and 22 between and outside parallel plates 29 and 30 and (ii) locking lever assembly 28 (see FIGS. 6A-6B and FIG. 7).

Locking assembly 10 comprises a locking member formed by parallel plates 29 and 30 held rigidly apart by spaced apart cross members 31-33 and arcuate cross member 34. The bottom edges of plates 29 and 30 are arcuate shaped to conform with the floor 35 used to form cavity 9. Plates 29 and 30 are also provided with aligned slots 36 and 37, respectively, to operatively house the axle 38 of roller 39. In a preferred embodiment handle 40 attaches to the top side 41 of arcuate cross member and extends outward to form an area 42 that can be gripped by the operator's fingers to pull up on handle 40.

To connect strap end 12 to locking assembly 10 end 12 is passed under arcuate cross member 34, then under and around cross member 31 through slot 43, then under and around cross member 32 through slot 44, then over and around cross member 33 and through slot 45, and around and under roller 39, then back through slot 45, over cross member 33, through slot 44, under cross member 32, through slot 43, over cross member 31 and laid on top of cavity floor. Strap end 12 can be pulled to shorten or lengthen the length of strap 12 from rod 18 to roller 39 in order to control the amount of tightening force that strap 7 will cause body 4 to exert against well casing pipe threaded end 2. The tightening force should be greater than the drag-off force imparted to the thread protector by the drilling platform floor when the well casing pipe is dragged across the floor.

In another preferred embodiment metallic support plates 46 and 47 are bonded in body end section 48 and extend into gap 13 and into cavities 49 and 50 in body end section 51. Plates 46 and 47 each have ends shaped to slide into cavities 49 and 50 as gap 13 is closed when locking assembly 10 is in a locked position, and serve to maintain alignment between body end sections 48 and 51.

To operate device 1 strap 7 is first connected to the locking assembly 10 as described above. The plates 46 and 47 also serve to resist shear forces to maintain alignment produced when the edge of the thread protector device 1 engages the drilling platform floor as the well casing pipe is being dragged from the pipe rack to the well head. Body 4 is then placed around the threaded end 2 of well casing pipe 3 and the operator pushes down on arcuate cross member 34 with his hand until plates 29 and 30 abut cavity floor 35. This movement in conjunction with the linking members 21 and 22 tightens strap 7 and forces body 4 against threaded end 2. To remove body 4 from the threaded end 2 the operator lifts up on handle 40 with his fingers to loosen strap 7.

There are of course other alternate embodiments which are obvious from the foregoing descriptions of the invention which are intended to be included within the scope of the invention as defined by the following claims.

What I claim is:

1. A device for protecting the threads of a well casing pipe which comprises:
   (a) a body constructed from material which is flexible and has resilient characteristics, said body being molded to have a central opening sized to fit about said threads and a gap between opposing ends of said body to provide the desired opening force and further having:
      (i) a passageway extending through said body concentric to said central opening, and
      (ii) a locking section having a cavity connecting to said passageway,
   (b) a strap constructed of a high tensile strength fiber web capable of being folded over upon itself positioned in said passageway with its opposite ends extending into said cavity, said strap being of sufficient size and flexibility so as to enable removal from and replacement to said passageway, and
   (c) a locking assembly operatively attached to the opposite ends of said strap to tighten said strap about said body to the degree necessary for said body to contact said threads.

2. A device according to claim 1 wherein the first of said opposing ends of said body has a cavity facing the other opposing end of said body, and said other opposing end has a protruding rigid member shaped to fit into said cavity of said first body end when said locking assembly is operatively engaged in a locking position.

3. A device according to claim 1 wherein said locking assembly comprises a linking assembly comprising separated parallel plates having aligned first openings to receive a first pin to which one end of said strap is attached and having aligned second openings to receive a second pin to which a cam over-center lever arm is operatively attached, and wherein the opposite end of said strap is attached to said lever arm.

* * * * *